United States Patent [19]
Storck et al.

[11] Patent Number: 4,633,171
[45] Date of Patent: Dec. 30, 1986

[54] WINDOW FUNCTION FOR AN APERTURE WINDOW

[75] Inventors: Eckhard Storck; Ulrich Wolff, both of Munich, Fed. Rep. of Germany

[73] Assignee: Siemens Aktiengesellschaft, Berlin and Munich, Fed. Rep. of Germany

[21] Appl. No.: 699,948

[22] Filed: Feb. 8, 1985

[30] Foreign Application Priority Data

Feb. 10, 1984 [DE] Fed. Rep. of Germany ....... 3404810

[51] Int. Cl.$^4$ ............................................. G01R 23/16
[52] U.S. Cl. ................. 324/77 K; 350/162.2; 350/96.19
[58] Field of Search .................. 324/77 R, 77 B, 77 K; 350/162.12, 162.16, 162.11, 96.12, 96.14, 96.19, 162.2

[56] References Cited

U.S. PATENT DOCUMENTS 4,262,996 4/1981 Yao .................................. 350/162.2

OTHER PUBLICATIONS

Proc. of the IRE and Waves and Electrons, Jun. 1946, "A Current Distribution for Broadside Arrays Which Optimizes the Relationship Between Beam Width and Side-Lobe Level", by C. L. Dolph, pp. 335-348.

Proc. of the IRE, vol. 35, 1947, "A Current Distribution for Broadside Arrays Which Optimizes the Relationship Between Beam Width and Side-Lobe Level", by C. L. Dolph, pp. 489-492.

Progress in Optics III, 1964, "The Apodisation of Antenna Beams. A Comparison with the Corresponding Optical Problem", pp. 112-123.

Proc. of IEEE, vol. 66, No. 1, Jan. 1978, "On the Use of Windows for Harmonic Analysis with the Discrete Fourier Transform", Harris, pp. 51-83.

*Primary Examiner*—Michael J. Tokar
*Attorney, Agent, or Firm*—Hill, Van Santen, Steadman & Simpson

[57] ABSTRACT

A window function optimum for apodization of diffraction at an aperture of a Bragg Cell spectral analyzer. A window function is derived which is simpler to realize and which comes very close to an optimum window function.

6 Claims, 3 Drawing Figures

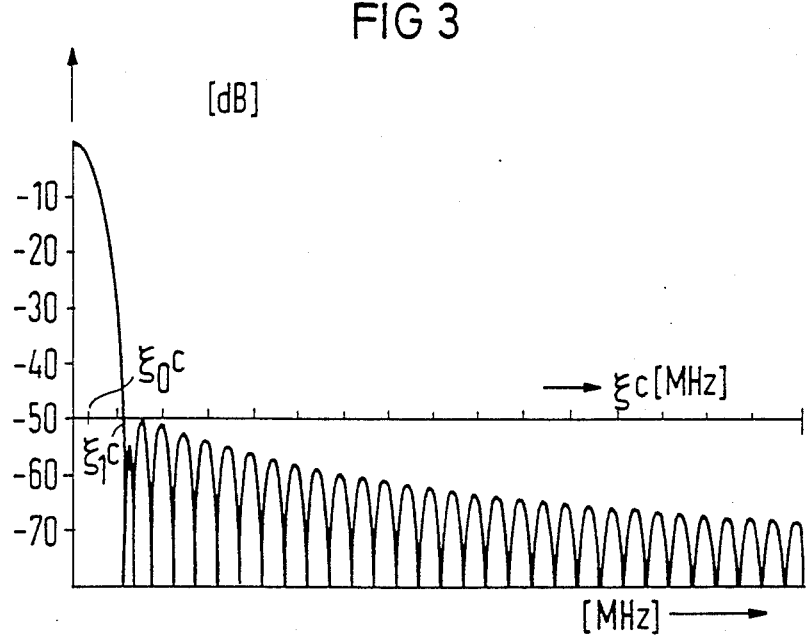

WINDOW FUNCTION FOR AN APERTURE WINDOW

BACKGROUND OF THE INVENTION

The present invention relates to a window function for an aperture and more specifically to a Bragg cell spectral analyzer wherein a window function is provided for apodization of diffraction at an aperture of the cell.

The dynamics of a Bragg cell spectral analyzer in the environment of a signal is limited by the diffraction of the laser beam at the finite aperture of the Bragg cell and can be reduced by apodization with suitable window functions.

Many such window functions which enable an apodization of the secondary diffraction maximums under a specific target level, particularly under a target level of $-50$ dB under the level of the principal diffraction maximum, are described in the literature (v. F. J. Harris, "On the Use of Windows for Harmonic Analysis with the Descrete Fourier Transform", Proc. IEEE 66 (1978) 51-83 and P. Jacquinot, B. Roizen-Dossier, Apodization, Progress in Optics III, E. Wolf, ed., North-Holland Publ. Comp., Amsterdam, 1964), incorporated herein by reference. But a more or less pronounced spread of the principal diffraction maximum is always connected therewith. This means a deterioration of the frequency resolution and thus of the dynamics for the Bragg cell spectral analyzer.

SUMMARY OF THE INVENTION

An object of the invention is to specify an optimum or nearly optimum window function of the above-described type which produces an apodization under a prescribable target level at the theoretically narrowest principal maximum, or close thereto.

This object is achieved by two types of window functions as explained hereafter. These window functions provide an optimum or nearly optimum window function for producing an apodization of diffraction such as in an aperture of a Bragg cell spectral analyzer.

The first-cited window function of the invention $$A(x) = \begin{cases} \dfrac{\cosh^{-1}(\sqrt{10^k})I_1(\sqrt{1-(2x/D)^2}\cdot\cosh^{-1}(10^k))}{\sqrt{D}\sqrt{1-(2x/D)^2}} + \frac{1}{2}\left(\delta\left(x+\frac{D}{2}\right) + \delta\left(x-\frac{D}{2}\right)\right) & \text{for } |x| \leq \frac{D}{2} \\ 0 & \text{for } |x| > \frac{D}{2} \end{cases}$$

has the following advantages:

It represents a continuous window function which has been derived from the known, discrete DOLPH-TSCHEBYSCHEFF window function (v. C. L. Dolph, A Current Distribution for Broadside Arrays which optimizes the Relationship between Beam Width and Side-Lobe level, Proc. IRE 34 (1946) 335-348 and C. L. Dolph, Discussion on "A Current Distribution for Broadside Arrays which optimizes the Relationship between Beam Width and Side-Lobe Level", Proc. IRE 35 (1947) 489-492), incorporated herein by reference. This applies to discrete windows with equidistant punctiform openings. A skillful boundary transition is employed which guarantees that the optimum window function is found.

For discrete windows having the aperture width D, more precisely for windows having $2N+1$ ($N=1,2,\ldots$) punctiform openings having the same spacing $D/2N$ from one another, the optimization problem stated above has already been resolved in antenna theory, namely by a non-analytically representable DOLPH-TSCHEBYSCHEFF window function whose Fourier transform is given by the TSCHEBYSCHEFF polynomial.

$$T_{2N}\left(\beta\cos\pi\xi\frac{D}{2N}\right)$$

with $T_{2N}(\beta) = \sqrt{10^k}$, i.e., $\beta = \cosh\left(\frac{1}{2N}\cosh^{-1}(\sqrt{10^k})\right)$ The afore-mentioned, skillful boundary transition which leads to the first-cited continuous window function of the invention occurs upon separation of the divergences that are present at the edge of the DOLPH-TSCHEBYSCHEFF window function.

The first-cited window function of the invention exists explicitly as a simple and surveyable analytic expression, and its Fourier transform, which represents its spectrum and thus the form of the diffraction pattern, is given in just as simple and surveyable an analytic form by $$F(\xi) = \cosh\sqrt{(\cosh^{-1}(\sqrt{10^k}))^2 - (\pi\xi D)^2}$$

Simple analytical expressions which define the resolution attainable under the most favorable conditions to the prescribed target level likewise derive from the first-cited window function of the invention for the half-intensity and total width of the spectral maximum of the diffraction pattern. The half-intensity width of the spectral maximum is given by $$\xi_1 = \frac{1}{\pi D}\sqrt{(\cosh^{-1}(\sqrt{10^k}))^2 - (\cosh^{-1}(\sqrt{\frac{1}{2}10^k}))^2}$$

The total width of the spectral maximum is given by $$\xi_0 = \frac{1}{\pi D}\cosh^{-1}(\sqrt{10^k})$$

and corresponds to the width of the spectral maximum at the height of the target level.

In the realization of the first-cited window function of the invention, the two delta functions at the edge of the aperture can, for example, be produced by spherical waves that are additionally mirrored in. Distributed onto an optically resolvable element on the order of magnitude of a wavelength, the delta functions supply values that are entirely finite.

The two delta-function-like divergences can, however, simply be subtracted. The following Fourier transform is thus obtained from the first-cited window function of the invention:

$$F(\xi) = \cosh\sqrt{(\cosh^{-1}(\sqrt{10^k}))^2 - (\pi\xi D)^2} - \cos(\pi\xi D)$$

In the environment of the principal maximum, this Fourier transform is formed of two cosine oscillations which can constructively add up, i.e. can double the target level. In order for the target level to remain under the principal maximum by the factor $1/\sqrt{10^k}$, this must therefore be doubled, i.e. the expression $\sqrt{10^k}$ must be replaced by the expression $2 \cdot \sqrt{10^k}$. The new function $$\overline{F}(\xi) = \cosh\sqrt{(\cosh^{-1}(2\sqrt{10^k}))^2 - (\pi\xi D)^2} - \cos(\pi\xi D)$$

thus derives, the square $|\overline{F}(\xi)|^2$ thereof defining a curve of the secondary diffraction maximums which in fact lies under the target level, for example under $-50$ dB, and from which the second-cited window function of the invention derives as $$A(x) = \begin{cases} \dfrac{I_1(\sqrt{1-(2x/D)^2}\ \cosh^{-1}(2\sqrt{10^k}))}{\sqrt{1-(2x/D)^2}} & \text{for } |x| \leq \dfrac{D}{2} \\ 0 & \text{for } |x| > \dfrac{D}{2} \end{cases}$$

which no longer has any divergences at the edge. It can be more easily realized than the first-cited window function of the invention and its frequency resolution lies close to the theoretical optimum.

The half-intensity width of the principal maximum of its spectrum is given by $$\xi_1 = \frac{1}{\pi D}\sqrt{(\cosh^{-1}(2\sqrt{10^k}))^2 - (\cosh^{-1}(\sqrt{10^k \cdot 2}))^2}$$

and the total width at the height of the target level is given by $$\xi_0 = \frac{1}{\pi D}\cosh^{-1}(2 \cdot \sqrt{10^k}).$$

A Bragg cell spectral analyzer having significantly improved dynamics (30 dB hitherto) was able to be constructed with a window function of the invention wherein the measured dynamics values amounted to: dynamic range 60 dB, 1-tone dynamics 50 db (frequency separation 8 MHz), and 2-tone dynamics 45 dB.

Figure 1:
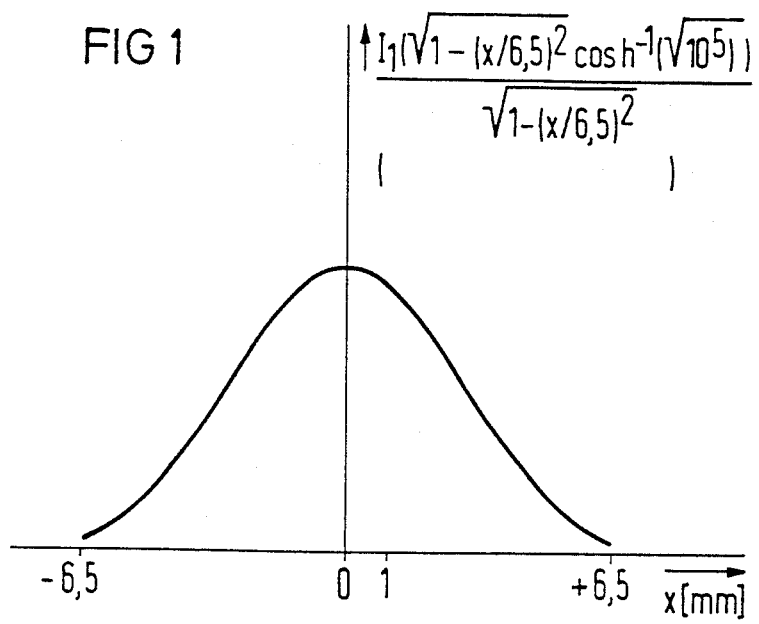
FIG. 1 shows the function $$I_1(\sqrt{1-(x/6.5)^2} \cdot \cosh^{-1}(\sqrt{10^5}))/\sqrt{1-(x/6.5)^2}$$
Figure 2:
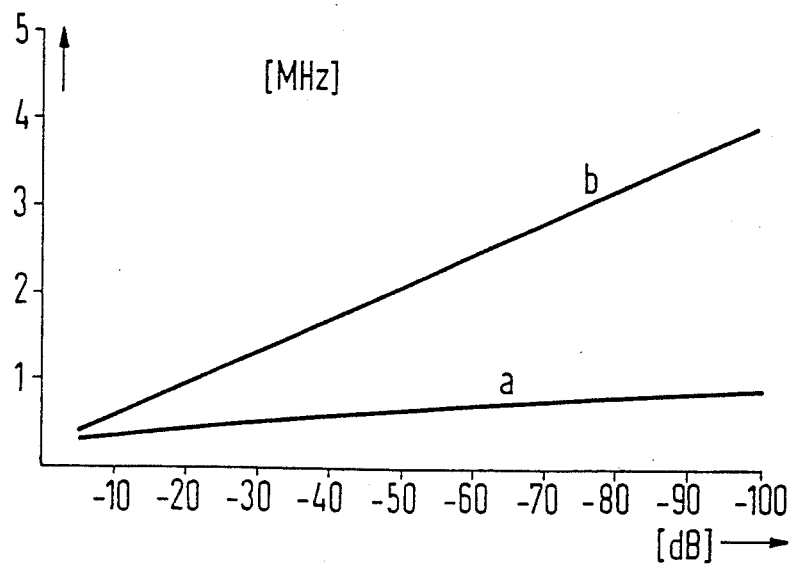

over the spatial coordinate x in a region $x \leq 6.5$ mm, i.e. over an aperture window having the aperture width $D = 13$ mm, whereby the unit on the ordinate has been arbitrarily selected;

FIG. 2 shows the half-intensity width (a) and the total width (b) of the principal maximum as a function of the required dynamics given optimum apodization; the relatively slight change of the half-intensity width (a) over the dynamics can be seen; and FIG. 3 illustrates the spectrum $\overline{F}(\xi)$ which belongs to the second-cited window function.

DESCRIPTION OF THE PREFERRED EMBODIMENTS

The figures are based on the following values: $k=5$, which corresponds to a target level of $-50$ dB. The aperture width D of the aperture window is selected at 13 mm. It is further assumed that the Bragg cell is realized in a lithium niobate crystal in which the speed of sound amounts to $c = 6$. km/s.

For the case of the first-cited window function, the half-intensity value of the principal maximum multiplied by twice the speed of sound, and which corresponds to the 3-dB width of this maximum, amounts to $2 \cdot \xi_1 \cdot c = 0.668$ MHz. The corresponding total width of this principal maximum which corresponds to the 50-dB width of this maximum amounts to $2 \cdot \xi_0 \cdot c = 2.08$ MHz.

For the second-cited window function for the corresponding 3-dB width or half-intensity width, $2 \cdot \xi_1 \cdot c = 0.71$ MHz is valid and, for the corresponding 50-dB width or total width, $2 \cdot \xi_0 \cdot c = 2.3$ MHz is valid. These values may be derived from FIG. 3 and lie only slightly above the above-specified values for the theoretical maximum in accordance with the first-cited window function.

Although various minor changes and modifications might be proposed by those skilled in the art, it will be understood that we wish to include within the claims of the patent warranted hereon all such changes and modifications as reasonably come within our contribution to the art.

We claim as our invention:

1. A Bragg cell spectral analyzer aperture window, comprising: aperture window means for apodization of diffraction, thereat and comprising a window function (A(x)) defining a spatial intensity distribution over a specific spatial coordinate (x) to be impressed on radiation passing through the aperture window means except for a prescribable standardization factor, the window function A(x) being defined by $$A(x) =$$

$$\begin{cases} \dfrac{\cosh^{-1}(\sqrt{10^k})I_1(\sqrt{1-(2x/D)^2} \cdot \cosh^{-1}(\sqrt{10^k}))}{D\sqrt{1-(2x/D)^2}} + \\ \quad \frac{1}{2}\left(\delta\left(x+\dfrac{D}{2}\right) + \delta\left(x-\dfrac{D}{2}\right)\right) & \text{for } |x| \leq \dfrac{D}{2} \\ 0 & \text{for } |x| > \dfrac{D}{2} \end{cases}$$

Where $I_1(\ldots)$ denotes the modified Bessel function of the first kind and first order, k is a prescribable number which defines a target level of apodization, D denotes an aperture width of the aperture along the spatial coordinate (x), and $\delta(\ldots)$ denotes Dirac's delta function.

2. A Bragg cell spectral analyzer aperture window, comprising: aperture window means for apodization of diffraction, thereat and comprising a window function (A(x)) defining a spatial intensity distribution over a specific spatial coordinate (x) to be impressed on radiation passing through the aperture window means except for a prescribable standardization factor, the window function A(x) being defined by $$A(x) = \begin{cases} \dfrac{I_1(\sqrt{1-(2x/D)^2} \cdot \cosh^{-1}(2\sqrt{10^k}))}{\sqrt{1-(2x/D)^2}} & \text{for } |x| \leq \dfrac{D}{2} \\ 0 & \text{for } |x| > \dfrac{D}{2} \end{cases}$$

where $I_1(\ldots)$ denotes the modified Bessel function of the first kind and first order, k is a prescribable number which defines a target level of apodization, D denotes an aperture width of the aperture along the spatial coordinate (x), and $\delta(\ldots)$ denotes Dirac's delta function.

3. In a Bragg cell spectral analyzer wherein a window function is provided for apodization of diffraction at an aperture thereof wherein the improvement comprises: said aperture having for said apodization a window function (A(x)) defining a spatial intensity distribution over a specific spatial coordinate (x) to be impressed on raditaion passing through said aperture except for a prescribable standardization factor, the window function A(x) being defined by $$A(x) = \begin{cases} \dfrac{\cosh^{-1}(\sqrt{10^k})I_1(\sqrt{1-(2x/D)^2} \cdot \cosh^{-1}(\sqrt{10^k}))}{D\sqrt{1-(2x/D)^2}} + \\ \frac{1}{2}\left(\delta\left(x+\dfrac{D}{2}\right) + \delta\left(x-\dfrac{D}{2}\right)\right) \text{ for } |x| \leq \dfrac{D}{2} \\ 0 \quad \text{for } |x| > \dfrac{D}{2} \end{cases}$$

where $I_1(\ldots)$ denotes the modified Bessel function of the first kind and first order, k is a prescribable number which defines a target level of apodization, D denotes an aperture width of the aperture along the spatial coordinate (x), and $\delta(\ldots)$ denotes Dirac's delta function.

4. In a Bragg cell spectral analyzer wherein a window function is provided for apodization of diffraction at an aperture thereof wherein the improvement comprises: said aperture having for said apodization a window function (A(x)) defining a spatial intensity distribution over a specific spatial coordinate (x) to be impressed on radiation passing through said aperture except for a prescribable standardization factor, the window function A(x) being defined by $$A(x) = \begin{cases} \dfrac{I_1(\sqrt{1-(2x/D)^2} \cdot \cosh^{-1}(2\sqrt{10^k}))}{\sqrt{1-(2x/D)^2}} & \text{for } |x| \leq \dfrac{D}{2} \\ 0 & \text{for } |x| > \dfrac{D}{2} \end{cases}$$

wherein $X_1(\ldots)$ denotes the modified Bessel function of the first kind and first order, k is a prescribable number which defines a target level of apodization, D denotes an aperture width of the aperture along the spatial coordinate (x), and $\delta(\ldots)$ denotes Dirac's delta function.

5. An aperture window comprising aperture window means for apodization of diffraction thereat and comprisng a window function (A(x)) defining a spatial intensity distribution over a specific spatial coordinates (x) to be impressed on radiation passing through the aperture window means except for a prescribable standardization factor, the window function A(x) being defined by $$A(x) = \begin{cases} \dfrac{\cosh^{-1}(\sqrt{10^k})I_1(\sqrt{1-(2x/D)^2} \cdot \cosh^{-1}(\sqrt{10^k}))}{D\sqrt{1-(2x/D)^2}} + \\ \frac{1}{2}\left(\delta\left(x+\dfrac{D}{2}\right) + \delta\left(x-\dfrac{D}{2}\right)\right) \text{ for } |x| \leq \dfrac{D}{2} \\ 0 \quad \text{for } |x| > \dfrac{D}{2} \end{cases}$$

where $I_1(\ldots)$ denotes the modified Bessel function of the first kind and first order, k is a prescribable number which defines a target level of apodization, D denotes an aperture width of the aperture along the spatial coordinate (x), and $\delta(\ldots)$ denotes Dirac's delta function.

6. An aperture window comprising aperture window means for apodization of diffraction thereat and, comprising a window function (A(x)) defining a spatial intensity distribution over a specific spatial coordinates (x) to be impressed on radiation passing through the aperture window means except for a prescribable standardization factor, the window function A(x) being defined by $$A(x) = \begin{cases} \dfrac{I_1(\sqrt{1-(2x/D)^2} \cdot \cosh^{-1}(2\sqrt{10^k}))}{\sqrt{1-(2x/D)^2}} & \text{for } |x| \leq \dfrac{D}{2} \\ 0 & \text{for } |x| > \dfrac{D}{2} \end{cases}$$

where $I_1(\ldots)$ denotes the modified Bessel function of the first kind and first order, k is a prescribable number which defines a target level of apodization, D denotes an aperture width of the aperture along the spatial coordinate (x), and $\delta(\ldots)$ denotes Dirac's delta function.

* * * * *